United States Patent
Oks et al.

(10) Patent No.: US 12,067,806 B2
(45) Date of Patent: Aug. 20, 2024

(54) SYSTEM FOR CORRECTING USER MOVEMENT

(71) Applicant: AMAZON TECHNOLOGIES, INC., Seattle, WA (US)

(72) Inventors: Eduard Oks, Redmond, WA (US); Ridge Carpenter, Seattle, WA (US); Lamarr Smith, Seattle, WA (US); Claire McGowan, Seattle, WA (US); Elizabeth Reisman, Seattle, WA (US); Ianir Ideses, Raanana (IL); Eli Alshan, Kfar-Saba (IL); Mark Kliger, Modi'in-Maccabim-Re'ut (IL); Matan Goldman, Redmond, WA (US); Liza Potikha, Tel Aviv (IL); Ido Yerushalmy, Tel-Aviv (IL); Dotan Kaufman, Netanya (IL); Guy Adam, Tel Aviv (IL); Omer Meir, Redmond, WA (US); Lior Fritz, Seattle, WA (US); Imry Kissos, Redmond, WA (US); Georgy Melamed, Ramat Gan (IL); Eran Borenstein, Zichron Yaakov (IL); Sharon Alpert, Rehovot (IL); Noam Sorek, Zichron Yaakov (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 712 days.

(21) Appl. No.: 17/176,479

(22) Filed: Feb. 16, 2021

(65) Prior Publication Data
US 2022/0261574 A1    Aug. 18, 2022

(51) Int. Cl.
| | |
|---|---|
| *G06K 9/00* | (2022.01) |
| *G06N 20/00* | (2019.01) |
| *G06T 7/70* | (2017.01) |
| *G06V 40/20* | (2022.01) |

(52) U.S. Cl.
CPC ............. *G06V 40/23* (2022.01); *G06N 20/00* (2019.01); *G06T 7/70* (2017.01)

(58) Field of Classification Search
CPC .......... G06F 3/011; G06F 3/017; G06F 3/014; G06F 18/24; G06F 3/0304; G06F 3/0346;
(Continued)

(56) References Cited

U.S. PATENT DOCUMENTS

| | | | | |
|---|---|---|---|---|
| 2015/0186743 | A1* | 7/2015 | Karnos | H04N 23/70 382/195 |
| 2019/0385328 | A1* | 12/2019 | Grosse-Kunstleve | H04N 23/57 |
| 2021/0082128 | A1* | 3/2021 | Okada | G06T 7/248 |

OTHER PUBLICATIONS

Darolti, Cristina "Patent Cooperation Treaty International Search Report and Written Opinion dated Jun. 1, 2022", Patent Cooperation Treaty Application No. PCT/US22/70666, Patent Cooperation Treaty, Jun. 1, 2022.

(Continued)

*Primary Examiner* — Alex Kok S Liew
(74) *Attorney, Agent, or Firm* — Lindauer Law, PLLC

(57) ABSTRACT

Characteristics of a user's movement are evaluated based on performance of activities by a user within a field of view of a camera. Video data representing performance of a series of movements by the user is acquired by the camera. Pose data is determined based on the video data, the pose data representing positions of the user's body while performing the movements. The pose data is compared to a set of existing videos that correspond to known errors to identify errors performed by the user. The errors may be used to generate scores for various characteristics of the user's movement. Based on the errors, exercises or other activities to improve the movement of the user may be determined and included in an output presented to the user.

20 Claims, 6 Drawing Sheets

(58) Field of Classification Search
CPC .... G06F 18/256; G06F 18/22; G06F 2111/04; G06F 3/01; G06F 3/016; G06F 30/00; G06F 30/17; G06F 18/00; G06V 10/82; G06V 20/56; G06V 10/811; G06V 10/764; G06V 20/176; G06V 20/58; G06V 20/588; G06V 20/64; G06T 2207/10016; G06T 7/73; G06T 2207/20084; G06T 7/75; G06T 7/74; G06T 2207/10028; G06T 2207/30244; G06T 19/20; G06T 2207/20081; G06T 2207/10012; G06T 13/40; G06T 17/00; G06T 19/006

See application file for complete search history.

(56) References Cited

OTHER PUBLICATIONS

Meng, Zhaozong, et al., "Recent Progress in Sensing and Computing Techniques for Human Activity Recognition and Motion Analysis", Electronics, MDPI AG, Aug. 21, 2020, vol. 9, pp. 1-19. http://dx.doi.org/10.3390/electronics9091357>p. 1-p. 10.

Darolti, Cristina, "Patent Cooperation Treaty International Preliminary Report on Patentability and Written Opinion dated Aug. 31, 2023", Patent Cooperation Treaty Application No. PCT/US22/70666, Patent Cooperation Treaty, Aug. 31, 2023.

* cited by examiner

SYSTEM FOR CORRECTING USER MOVEMENT

BACKGROUND

Determining various characteristics of the movement of an individual, such as the posture, stability, and range of motion of the user, may be a useful metric regarding the health and fitness of the individual. For example, an individual may have fitness goals relating to range of motion, or an individual may wish to develop adequate mobility before undertaking an activity for which mobility would be beneficial. However, determining characteristics of movement and methods for improving mobility typically requires analysis of the movement by a knowledgeable expert.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
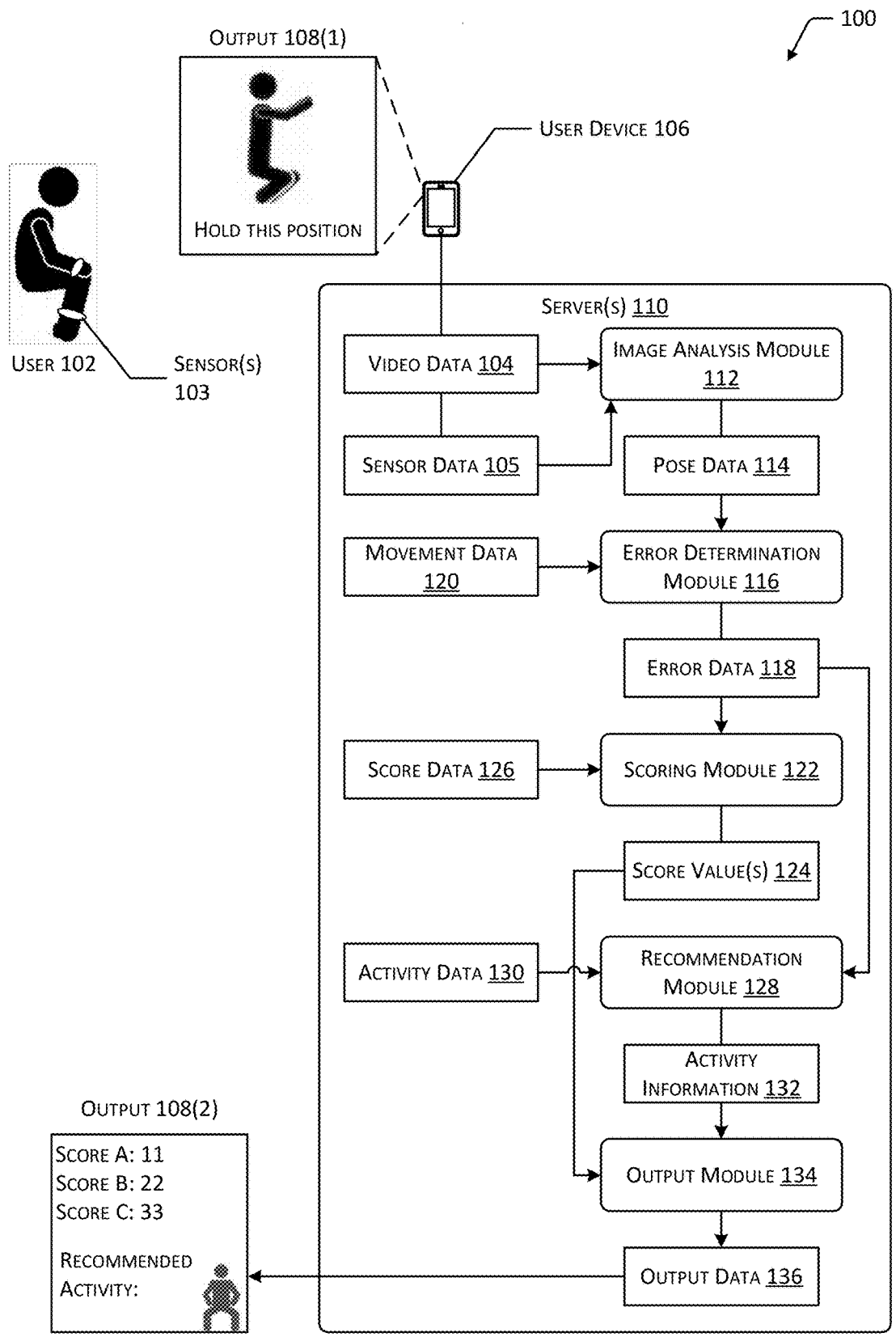
FIG. 1 is a diagram illustrating an implementation of a system for determining characteristics of movement of a user based on acquired video data or other data representing the user performing one or more movements.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Evaluation of the movement of an individual may include measurement of various characteristics, such as the posture, stability, and mobility (e.g., range of motion) of the individual. In some cases, an individual may seek to improve quality of movement as a fitness goal. In other cases, an individual may seek to improve quality of movement in preparation for undertaking an activity for which such movement may be beneficial. However, the evaluation of characteristics of an individual's movement may require subjective analysis, such as by a trainer or other expert, which may be affected by error or bias associated with an expert. After evaluating the characteristics of an individual's movement, a trainer or other expert may provide recommendations regarding activities to improve the individual's movement. However, due to the subjective nature of such an evaluation, recommended methods by which an individual may improve various characteristics of movement, such as fitness exercises intended to improve posture, stability, or mobility, may achieve suboptimal results.

Described in this disclosure are techniques for evaluating characteristics of movement of a user, providing an output indicative of the characteristics such as one or more scores, and recommending exercises or other activities that may improve the characteristics of movement. A user may be presented with instructions to perform one or more movements, such as by presenting a video or other types of instruction that demonstrate or explain performance of the movements. The user may perform the movement(s) within a field of view of a camera, which may acquire video data representing the user performing the movement(s). For example, the user may be instructed to perform a series of five selected movements, and may perform from three to five repetitions of each movement. In some implementations, prior to acquiring video data, a device associated with the camera may determine whether the user is positioned relative to the camera in a manner that would enable evaluation of the movements of the user based on the acquired video data. For example, the distance of the user relative to the camera may be determined to be within a threshold range, and a determination may be made that at least a threshold portion of the body of the user is visible within the field of view of the camera. In some implementations, data from a depth sensor, time-of-flight sensor, or other types of sensors may be used to determine a distance of the user relative to the camera or whether at least a threshold portion of the body of the user is within the field of view of the camera. For example, output from a sensor may include point cloud data that may be processed to determine locations of body parts of the user.

In some implementations, data from other sensors, in addition to video data from a camera, may be acquired. For example, movement or stability of a body part of a user may be determined using data from one or more accelerometers, movement or a position of one or more body parts of the user may be determined based on sensors that are worn, held, or positioned in an environment with the user, physiological sensors may be used to determine data indicative of one or more physiological values associated with the user, and so forth. Data from sensors may also be used to determine the positions or movement of one or more body parts of a user that may be occluded from view by a camera.

Based on the acquired video data, and in some cases other sensor data, pose data may be determined, the pose data representing positions of the body of the user during performance of the movement(s). For example, in each frame of the acquired video data, the pose of the body of the user may be determined using pose extraction, object recognition, or other image analysis techniques. Each pose may be represented by a set of points, each point representing the location and orientation of a body part of the user, such as positions of the user's knees, feet, hips, head, and so forth. The locations and orientations of one or more points of a pose may be constrained by the location of one or more other points based on a set of rules. For example, the location of a point representing a user's foot may be constrained based on the location of a point representing the user's knee, and vice versa. As another example, the location of points representing a user's wrist, shoulder, and elbow may be constrained by a rule indicating a maximum or minimum angle at which the elbow may be positioned. The determined pose data may also include segmentation data, shape data, and so forth, which may be determined based on the video data. For example, data indicating portions of a frame of a video that depict a user, a background, other objects, and so forth may also be determined.

In some implementations, the pose data may be subdivided into portions representative of particular movements, individual repetitions of movements, or other portions based on segmentation data. For example, segmentation data may indicate poses associated with a single repetition of a movement, and based on the segmentation data, portions of the pose data that are associated with individual repetitions may be identified. Identification of portions of the pose data that correspond to particular movements and repetitions of the movements may facilitate evaluation of the movement of the user, and in some cases may be used when computing a score or other output. For example, the user may perform three repetitions of a movement, and an average score based on each repetition may be used when presenting an output.

The determined pose data that is representative of the user's positions during performance of the movement(s) may then be classified based on existing movement data that associates poses of users with errors in movement. For example, movement data may include video data acquired from other users performing the same or similar movements. Pose data may be determined based on the video data acquired from other users and may be annotated with indications of errors associated with the pose data. For example, the movement data may include one or more videos representing instructors, trainers, or other experts performing the movement(s) correctly (e.g., without errors). Movement data may also include videos representing users performing the movement(s) while committing one or more errors. The videos may be associated with annotations provided by experts or other users that indicate the errors present in the videos and in some cases an indication of a severity of the error(s), or the absence of errors. In some cases, movement data may include videos representing users performing the movement(s) that have been previously evaluated using the systems described herein or through other analysis techniques performed using one or more computing devices. Independent of the source of the movement data, in some implementations, a machine learning system may be used to classify the pose data determined from the user based on the movement data. For example, using pose data determined from multiple input videos of the movement data as inputs, a neural network or other type of machine learning system may classify the poses of the user to determine corresponding poses of the movement data within a threshold level of confidence. Based on correspondence between the movement data and the pose data determined from the user, one or more errors associated with the movement(s) performed by the user and in some implementations, an indication of severity for one or more of the errors, or an absence of errors may be determined. For example, if a particular movement performed by the user closely corresponds to a set of poses included in the movement data within a threshold level of confidence, the errors associated with the poses of the movement data may be assumed to be present in the movement performed by the user.

As one example, based on the pose data, the movement of the user may be evaluated with regard to twenty possible errors. Each error may be associated with an indication of severity, such as a severity level of zero if the error did not occur in the user's movement(s), a severity level of one for a minor error, a severity level of two for a moderate error, and a severity level of three for a severe error or a failure to perform a particular movement. Continuing the example, the user may be instructed to perform five movements, and each movement may correspond to one or more possible errors. In some cases, multiple movements may be associated with one or more of the same errors. In other cases, a movement may be associated with a set of errors that is separate and independent from the sets of errors associated with other movements. The errors, or lack of errors, that are determined to be associated with the movement(s) of the user, based on correspondence between the pose data and the movement data, may be used to determine an output indicative of characteristics of the movement of the user.

For example, score data may associate errors with score values, which may be used to determine one or more scores that represent a characteristic of the user's movement. Continuing the example, scores representative of the movement of a user may include a first score indicative of a mobility of the user's shoulder, a second score indicative of a stability of the user's shoulder, a third score indicative of a mobility of the user's hip, a fourth score indicative of a stability of the user's hip, a fifth score indicative of a mobility of the user's lower body, a sixth score indicative of a stability of the user's body, and so forth. Each score may be determined based on one or multiple score values, which may be determined based on correspondence between the score data and the errors associated with the pose data. In some cases, a single error may contribute to multiple scores, and the extent to which a particular error contributes to a particular score may be determined based on one or more weight values. For example, an error in the position of a user's arm may significantly contribute to a score indicative of stability of the user's shoulder, may slightly contribute to a score indicative of stability of the user's core, and may not contribute to a score indicative of stability of the user's lower body. A severity level associated with an error may also affect the extent to which the error contributes to a score. For example, a severe error regarding the placement of a user's foot may significantly affect the extent to which the error contributes to a score indicative of stability of the user's lower body, a minor error regarding the placement of the user's foot may only slightly affect the score, and the absence of an error may not affect the score or may affect the score in a direction opposite the direction in which a score is affected by the presence of an error.

Based on the score data, each of the errors associated with the pose data may be used to determine at least one score representative of a characteristic of the movement of the user, which may be presented in an output. In some implementations, an output may also include an indication of one or more activities that may be performed to improve characteristics of the user's movement. For example, activity data may associate one or more activities to improve characteristics of movement with corresponding errors. Based on correspondence between the activity data and the particular errors associated with the pose data of the user, one or more activities to improve characteristics of the user's movements may be determined. For example, in response to errors associated with stability of a user's core, one or more activities may include exercises intended to strengthen core muscles and improve core stability or a recommendation of one or more items or services that may facilitate improvement of stability or other characteristics of movement. One or more of the determined activities may also be presented in the output in addition to or in place of the score(s) representative of characteristics of the user's movement. In some implementations, in cases where multiple errors are determined, one or more of the errors may be associated with a priority level. In such a case, activities associated with an error having a higher priority may be presented in place of other activities associated with an error having a lower priority. Additionally, in some implementations, it may be determined based on the pose data that the body of the user is constrained from performance of one or more positions. In such a case, activities that include this position may not be recommended, or an indication of one or more modifications to the activity may be included in the output. In other implementations, if no errors in movement are determined, activities that correspond to particular poses of the user or scores determined for the user may be determined and recommended. Additionally, in some cases, if no errors in the movement of the user are determined, an activity that may facilitate retention of sufficient mobility or stability and maintaining the ability to perform the movements without occurrence of errors may be recommended.

At a subsequent time, the user may perform the movement(s) within a field of view of a camera, and additional video data may be acquired. The additional video data may be analyzed using the same processes described previously to determine errors associated with the movement(s), or the absence of errors, and one or more scores based on the errors or absence thereof. In some implementations, an output may include scores determined at multiple times, enabling a user to visualize improvement in characteristics of movement over time, or recognize types of movement or regions of the body where improvement may be necessary. An indication of subsequent activities may be included in an output based on the errors determined at the subsequent time. In some implementations, if an indication of a particular activity has previously been provided to a user within a threshold time period, a different activity may be recommended to prevent frequent repetition of identical recommendations.

Implementations described herein may therefore enable characteristics of the movement of a user to be evaluated without requiring subjective analysis by an expert, though use of an existing body of movement data that may be used to classify a video or other data acquired from the user. Errors determined from the video, or other data that is acquired from the user, may be used to determine one or more scores indicative of particular characteristics of movement and particular regions of the body, which may be presented to the user as meaningful indications of movement characteristics that may represent areas where the user excels or where improvement is possible. Additionally, based on the movements of the user, specific activities that address errors associated with the movement(s) of the user may be determined and presented in an output, enabling a user to potentially improve characteristics of movement through performance of the activities. While implementations described herein include use of a camera to acquire video data, in other implementations, other types of sensors, such as depth sensors, time-of-flight sensors (e.g., lidar), and so forth may determine point cloud data that may be processed to determine locations of body parts of a user. For example, pose data may be determined based on point cloud data or other types of data from a sensor in addition to or in place of video data acquired using a camera.

FIG. 1 is a diagram 100 illustrating an implementation of a system for determining characteristics of movement of a user 102 based on acquired video data 104 or other data representing the user 102 performing one or more movements. A user device 106 may present a first output 108(1), such as video, audio, or text instructions regarding performance of one or more movements. For example, the first output 108(1) may include a video output in which an instructor demonstrates performance of the movement(s) while providing verbal instruction. In other implementations, the first output 108(1) may include audio output, text, or other types of instructions for performance of the movement(s). In still other implementations, the first output 108(1) may be omitted and the user 102 may perform movement(s) in the absence of an output 108(1). The user 102 may perform the movement(s) within a field of view of a camera of the user device 106, which may acquire video data 104 representing the movement(s) of the user 102. In other implementations, the video data 104 may include data acquired using a depth camera, lidar device, or other types of sensors. For example, video data 104 may include point cloud data, depth information, and so forth, in addition to or in place of frames of image data. In some implementations, one or more sensors 103 in association with the body of the user 102 or in an environment with the user 102 may acquire sensor data 105 indicative of movement of the user 102. For example, sensor(s) 103 may include accelerometers that may determine movement of one or more parts of the body of the user 102, position sensors that determine movement or location of one or more body parts, touch sensors that determine contact between a body part of the user 102 and the sensor 103, and so forth. In some implementations, one or more sensors 103 may include physiological sensors that determine one or more physiological values associated with the user 102. For example, a cardiac rate, breath rate, or other physiological values may indicate movement of the user 102, a rate of movement, and so forth. In other implementations, one or more sensors 103 may include depth sensors, time-of-flight sensors, or other types of sensors that may be used to determine positions of body parts of the user 102. For example, a sensor 103 may output point cloud data that may be processed to determine locations and orientations of body parts of the user 102.

While FIG. 1 depicts the user device 106 as a smartphone, the user device 106 may include any type of computing device including, without limitation, a personal or portable computing device, such as a desktop, laptop, notebook, or tablet computer, a wearable computing device, a set top box device, and so forth. Additionally, while FIG. 1 depicts a single user device 106, in other implementations, multiple computing devices may be used to perform the functions described herein. For example, a first computing device associated with a display may present the first output 108(1), while a second computing device associated with a camera may acquire the video data 104, sensor data 105 from the sensor(s) 103, and so forth. Further, while FIG. 1 depicts the user device 106 as a smartphone having an integrated display and camera, in other implementations, the user device 106 may be separate from and in communication with a separate display device, a separate camera, or both a separate display device and camera.

One or more servers 110 may acquire the video data 104, and in some implementations the sensor data 105, from the user device 106. While FIG. 1 depicts the server(s) as a separate computing device from the user device 106, in other implementations, the user device 106 may perform all or a portion of the functions described with regard to the server(s) 110. Additionally, while FIG. 1 depicts one or more severs 110 acquiring the video data 104 and sensor data 105, any number and any type of computing device(s) may be used, including without limitation the types of computing devices described with regard to the user device 106.

An image analysis module 112 associated with the server(s) 110 may determine pose data 114 based on the acquired video data 104, and in some implementations, the acquired sensor data 105. The pose data 114 may represent one or more positions of the user 102 during performance of the movement(s). For example, the pose data 114 may include a determined position for at least a subset of the frames of the video data 104, and each position (e.g., pose) may be represented by a set of points, each point representing the location and orientation of a body part of the user 102. In some implementations, the image analysis module 112 may include one or more object recognition or segmentation algorithms that may identify portions of frames of video data 104 in which the user 102 is visible. For example, an object recognition algorithm may determine portions of a frame of video data 104 that correspond to particular body parts of the user 102, each of which may be represented as a point within a pose. In some implementations, the image analysis module 112 may include algorithms for determining locations of one or more body parts of the user 102 based on sensor data 105, such as data indicative of the location of a sensor 103 or movement of a sensor 103. The locations and orientations of one or more points may be constrained by the location of one or more other points based on a set of rules. In some implementations, the pose data 114 may associate each point of a pose with an identifier of the point with a particular location or orientation of the point. In some implementations, data regarding a point may also indicate movement of the point, a confidence value associated with the location of the point, and so forth. In some implementations, the pose data 114 may also include segmentation information, shape information, information regarding a three-dimensional position of an individual or other object (such as information determined using a depth (e.g., RGB-D) camera), and so forth that may indicate portions of video data 104 that include the user 102, a background, one or more other objects, and so forth. The pose data 114 may also include time data or frame data indicative of a frame or time associated with one or more poses represented by the pose data 114. For example, the pose data 114 may associate a first frame identifier or first time data indicative of a first time with a first set of points indicative of a first position of the user 102, and a second frame identifier or second time data with a second set of points indicative of a subsequent position of the user 102, and so forth.

In some implementations, the pose data 114 may be further analyzed or processed based on segmentation data. For example, segmentation data may include data indicative of poses or other types of data representing particular movements or repetitions of movements. Based on the segmentation data, a portion of the pose data 114 that corresponds to a particular movement or a particular repetition of a movement may be determined. In some implementations, based on the segmentation data, one or more portions of the pose data 114 that do not correspond to any of the movements may be determined and disregarded from analysis, such as to conserve computational resources, reduce data transmission, and so forth.

An error determination module 116 associated with the server(s) 110 may determine error data 118 based on correspondence between the pose data 114 and movement data 120. The movement data 120 associates pose data 114 determined from one or more videos, or sources of pose data 114, with corresponding errors represented by the pose data 114. For example, the movement data 120 may include one or more videos, or pose data 114 determined from the one or more videos, that represent other users 102 performing the movement(s). The poses indicated in the movement data 120 may be annotated, such as through expert review or an automated system, to determine errors represented by particular poses, and the absence of errors associated with particular poses. Continuing the example, a first video of the movement data 120 may include an instructor, trainer, or other expert performing the movement(s) correctly, representing the movement(s) performed without errors, a second video may include an expert or non-expert user 102 performing the movement(s) with a first set of errors, a third video may include an expert or non-expert user 102 performing the movement(s) with a second set of errors, and so forth.

In some implementations, the error determination module 116 may include a neural network or other type of machine learning system, which may classify the pose data 114 determined from the user 102 based on the movement data 120. For example, if a portion of the pose data 114 associated with a particular movement corresponds to a portion of the movement data 120 associated with the particular movement within a threshold level of confidence, this may indicate that the errors, or lack of errors, associated with the corresponding portion of the movement data 120 may also have occurred during performance of the movement by the user 102. Based on the correspondence between the movement data 120 and the pose data 114, the determined error data 118 may indicate particular errors that are associated with the pose data 114, an indication of the severity of one or more of the errors, and in some cases a lack of errors. For example, the movement data 120 may associate the absence of errors, one or more errors, or one or more indications of severity for the error(s), with each portion of the movement data 120 that corresponds to a particular movement.

The error data 118 associated with the pose data 114 determined form the movement(s) of the user 102 may be used to determine one or more characteristics of the movement(s). For example, a scoring module 122 associated with the server(s) 110 may determine one or more score values 124 based on the error data 118 and score data 126 that associates particular error data 118 with corresponding score values 124. In some implementations, the scoring module 122 may determine multiple score values 124 indicative of characteristics of the movement(s) of the user 102. In some cases, individual score values 124 may be associated with particular regions of the body of the user 102. For example, a first score value 124 may be indicative of a posture of the user 102, a second score value 124 may be indicative of a mobility of a shoulder of the user 102, a third score value 124 may be indicative of a stability of the shoulder of the user 102, a fourth score value 124 may be indicative of a stability of a core of the user 102, a fifth score value 124 may be indicative of a mobility of a hip of the user 102, a sixth score value 124 may be indicative of a stability of the hip of the user 102, a seventh score value 124 may be indicative of a mobility of a lower body of the user 102, and an eighth score value 124 may be indicative of a stability of the lower body of the user 102. In some implementations, the score value(s) 124 may include one or more average or aggregate values determined from one or more individual score values 124. For example, one or more determined score values 124 may include an overall indication of a mobility of the user 102, an overall indication of a stability of the user 102, and an overall indication of a posture of the user 102, each of which may be determined based on individual score values 124 associated with the corresponding characteristic of the movement of the user 102 for a particular body part. In some implementations, an overall movement score may be determined based on one or more of the individual score values 124. In some cases, one or more individual score values 124 may be weighted differently when determining one or more aggregate or average score values 124. For example, a score value 124 representing stability of the shoulder of the user 102 may be weighed less when determining an overall score value 124 for stability than a score value 124 representing stability of the lower body of the user 102.

Based on the score data 126, the error data 118 may affect one or multiple score values 124. For example, the score data 126 may indicate a weight associated with each error, which may vary depending on the particular score value 124. For example, the score data 126 may include rules, weights, algorithms, and so forth that indicate the effect of a particular error, and in some cases an indication of a severity of the error, when determining particular score values 124 representative of a characteristic of the movement of the user 102. Continuing the example, an error associated with a position of the shoulder of the user 102 may significantly affect a score value 124 indicative of a stability of the shoulder, may slightly affect a score value 124 indicative of a stability of the core, and may not affect a score value 124 indicative of a stability of the lower body. As another example, an error associated with an indication of high severity may significantly affect a score value 124 while an error associated with an indication of low severity may only slightly affect the score value 124. As yet another example, the absence of an error associated with the position of a body part may not affect a score associated with movement of the user 102, or may cause the score to be modified in a direction opposite the direction that the presence of one or more errors may cause the score to be modified.

The error data 118 associated with the pose data 114 may also be used to determine one or more activities that may improve characteristics of movement of the user 102, such as by reducing the severity or occurrence of errors, improving stability or mobility associated with movement of the user 102, increasing one or more suboptimal score values 124, maintaining one or more acceptable or optimal score values, and so forth. For example, a recommendation module 128 associated with the server(s) 110 may determine correspondence between the error data 118 and activity data 130 that associates the error data 118 or score values 124 with corresponding activities to determine activity information 132 indicative of one or more activities that correspond to the errors, or lack of errors, associated with the movement(s) of the user 102. Continuing the example, the activity data 130 may associate an error or set of errors with one or more corresponding activities that may be used to reduce occurrence or severity of the errors. In some cases, the activity data 130 may associate indications of severity for particular errors with corresponding activities. For example, a particular activity may be suitable to improve a severe error but less suitable to improve a minor error, or alternatively, an activity may be unsuitable to perform if the user 102 commits a particular error when performing a movement, but suitable if the user 102 does not commit the error.

An output module 134 associated with the server(s) 110 may determine output data 136 based on the determined score values 124 and activity information 132. At least a portion of the output data 136 may be provided to the user device 106 to cause presentation of a second output 108(2) that may include an indication of one or more score values 124 and in some implementations, an indication of at least a portion of the activity information 132. For example, FIG. 1 depicts the second output 108(2) presenting an indication of three score values 124 and an indication of an activity, the performance of which may reduce occurrence or severity of errors, improve characteristics of movement of the user 102, or improve one or more of the score values 124 at a subsequent time when the user 102 performs the movement(s).

Figure 2:
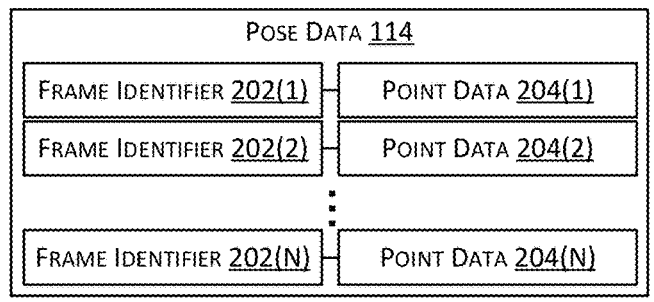
FIG. 2 is a series of block diagrams illustrating example implementations of pose data, movement data, score data, and activity data.
Figure 2:
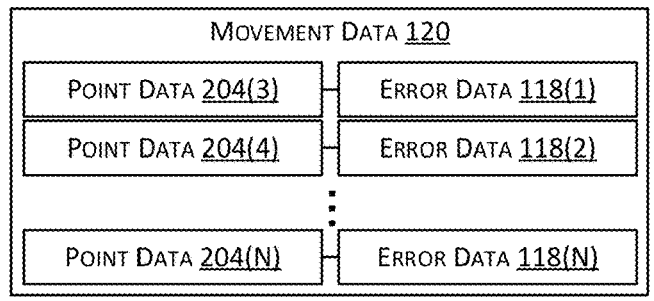
Figure 2:
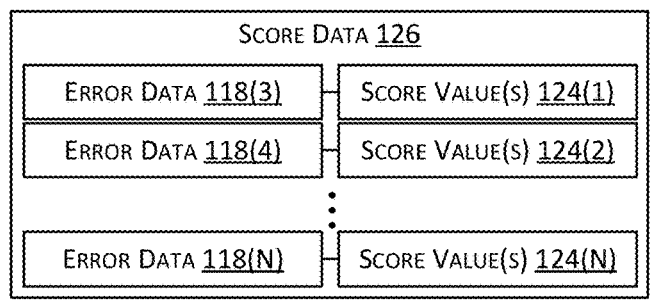
Figure 2:
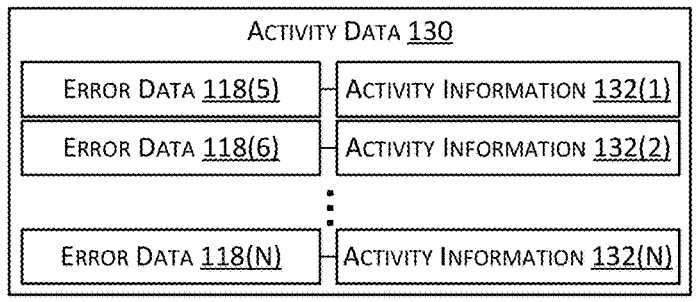

FIG. 2 is a series of block diagrams 200 illustrating example implementations of pose data 114, movement data 120, score data 126, and activity data 130. As described with regard to FIG. 1, pose data 114 may be determined based on video data 104, such as by performing object recognition, segmentation algorithms, pose extraction, and so forth. For example, received video data 104 may include a series of frames, each frame including a set of pixels. An image analysis module 112 may determine the pixels within a frame that correspond to a user 102, a background, other objects, and so forth. The pixels that correspond to positions of the user 102 may be analyzed, such as through use of one or more shape or object recognition algorithms, to determine the locations and orientations of one or more body parts of the user 102 within a frame, each location represented by a point. The locations and orientations of each point may be constrained based on a set of rules or constraints. For example, the location of a wrist of the user 102 may be constrained based on the location of the elbow of the user 102. The pose data 114 may therefore associate each frame of video data 104 with data regarding a corresponding set of points indicative of the locations and orientations of various body parts of the user 102. In some implementations, pose data 114 may be determined based in part on sensor data 105 determined using one or more sensors 103. For example, accelerometers may be used to determine movement of one or more body parts of a user 102, position, location, or contact sensors may determine a location of one or more body parts of the user 102, and so forth.

As shown in FIG. 2, the pose data 114 may associate a first frame identifier 202(1) of a first frame of video data 104 with corresponding point data 204(1). The point data 204(1) may include, for a series of points, a point identifier, such as an indication of the body part of the user 102 that is represented by the point, a location of the point within the frame, and data regarding the orientation of the body part represented by the point. As such, the point data 204(1) associated with the first frame identifier 202(1) may include multiple point identifiers (one point identifier for each point representing the pose of the user 102), each point identifier associated with an indication of a location and orientation. In some implementations, the pose data 114 may also include segmentation information indicative of a particular movement or repetition of a movement that is represented by the set of points indicated by the point data 204(1). Similarly, FIG. 2 depicts the pose data 114 including a second frame identifier 202(2) associated with second point data 204(2), and any number of additional frame identifiers 202(N) associated with corresponding point data 204(N).

As described with regard to FIG. 1, the pose data 114 determined based on video data 104 acquired from a user device 106 may be analyzed to determine characteristics of movement of the user 102, errors that were committed during performance of the movement, the absence of errors, and so forth. The characteristics of movement and the errors or lack of errors that were committed may be determined based in part on correspondence between the pose data 114 and movement data 120. In some implementations, the movement data 120 may be determined based on multiple input videos, pose data 114, or point data 204, and a machine learning system may classify the pose data 114 determined based on video data 104 from the user device 106 using the pose data 114 or point data 204 associated with the movement data 120.

FIG. 2 depicts the movement data 120 including a first set of point data 204(3) that may be determined from video data 104 or pose data 114. For example, an instructor, trainer, content curator, or other expert or non-expert individual may provide video data 104 representing performance of the movement(s). The provided video data 104 may be associated with annotations indicative of errors associated with the video data 104. Pose data 114 may be determined based on the video data 104, and the pose data 114 may include a set of points, represented by the point data 204(3). In other cases, pose data 114 or point data 204 may be provided from a user 102 or another source without processing video data 104 to determine the pose data 114 or point data 204. The point data 204(3) may be associated with corresponding error data 118(1) indicative of one or more errors associated with the position of an individual represented by the point data 204(3). The error data 118(1) may include identifiers indicating one or more errors, and in some cases, an indication of a severity associated with one or more of the errors. In some cases, the error data 118(1) may indicate a lack of errors or a severity indicating that an error did not occur. For example, the point data 204(3) may be associated with a set of twenty errors, each error associated with a severity level. Continuing the example, a severity level of zero may indicate that the error did not occur, while greater severity levels may indicate a greater severity of the error, with the greatest severity level indicating a failure to perform a movement. As such, the movement data 120 may associate a single set of point data 204(3) with a single error, multiple errors, or zero errors. FIG. 2 also depicts the movement data 120 including a second set of point data 204(4) that is associated with second error data 118(2), and any number of additional sets of point data 204(N) associated with corresponding error data 118(N).

As described with regard to FIG. 1, error data 118 that is determined to be associated with movement of a user 102, based on correspondence between pose data 114 associated with the user 102 and movement data 120, may be used to determine information to be included in an output 108. In some implementations, the output 108 may include one or more scores indicative of characteristics of movement of the user 102. In some cases, a score may correspond to a particular characteristic of movement, such as posture, mobility, or stability. In some cases, a score may correspond to a particular region of the body of the user 102, such as a shoulder, core, hip, or lower body of the user 102. Additionally, in some implementations, one or more score values 124 may be determined based on a combination of other score values 124. For example, a score value 124 may include a score representing the overall stability of movement of a user 102 that is determined based on multiple individual score values 124 representing the stability of particular body parts of the user 102.

The particular score values 124 associated with the movement of a user 102 may be determined based on correspondence between the error data 118 associated with the movement of the user 102 and score data 126. For example, FIG. 2 depicts the score data 126 associating error data 118(3) representing a first set of errors, and in some cases an indication of severity for one or more of the errors, with one or more corresponding score values 124(1). In some implementations, an error may be associated with a particular score value 124 based on the occurrence, lack of occurrence, or severity of the error. In other cases, a score value 124 may be determined based on the occurrence, lack of occurrence, or severity of the error and one or more rules or algorithms. For example, the score data 126 may indicate that a score value 124 of one hundred is indicative of performance of the movement(s) without error, while a particular error corresponds to a score value 124 of negative ten points. As a result, a score value 124 of ninety may be determined based on the occurrence of the error. A particular error may affect multiple score values. For example, an error associated with the position of the lower body of the user 102 may affect score values 124 associated with both the lower body and the hips of the user 102. In some cases, the score data 126 may also associate weight values with particular error data 118, or different errors may affect particular score values 124 by different amounts. FIG. 2 also depicts the score data 126 including a second set of error data 118(4) associated with corresponding score values 124(2), and any number of additional sets of error data 118(N) associated with corresponding score values 124(N).

As described with regard to FIG. 1, the error data 118 that is associated with movement of a user 102 may also be used to determine one or more activities, which may be presented in an output 108. For example, performance of particular activities may be useful to reduce the severity or occurrence of certain errors, improve characteristics of the movement of the user 102, improve scores that are determined with regard to the movement of the user 102, and so forth. The particular activities that may be relevant to the errors or other characteristics of movement of a user 102 may be determined based on correspondence between the error data 118 associated with pose data 114 determined from a user 102 and activity data 130, which associates sets of error data 118 with corresponding activity information 132.

For example, FIG. 2 depicts the activity data 130 associating a first set of error data 118(5) with corresponding activity information 132(1). The error data 118(5) may be indicative of a single error, multiple errors, or a lack of errors. In some implementations, the error data 118(5) may also be indicative of a severity value associated with one or more of the errors. In other implementations, the error data 118(5) may indicate only the occurrence or absence of one or more errors. The activity information 132(1) may include an identifier associated with a single activity or multiple activities, such as activity names. In some implementations the activity information 132(1) may include other information regarding an activity, such as audio, video, image-based, or text instructions regarding performance of the activity, a link to a video or other instructions regarding performance of the activity, and so forth. The activity data 130 may similarly associate a second set of error data 118(6) with second activity information 132(2), and any number of additional sets of error data 118(N) with corresponding activity information 132(N).

Figure 3:
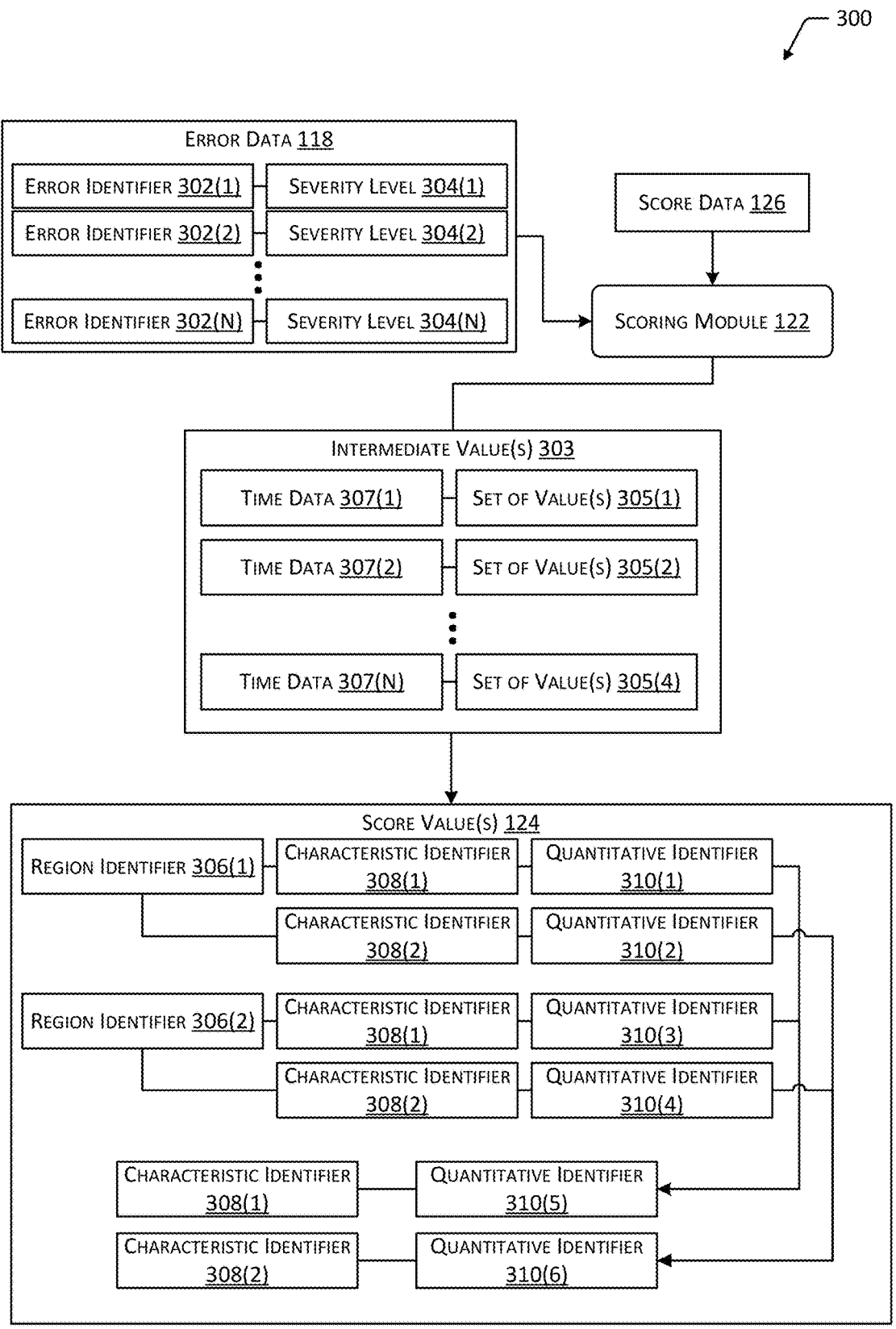
FIG. 3 is a block diagram illustrating an implementation of determining score values based on error data, score data, and other score values.

FIG. 3 is a block diagram 300 illustrating an implementation of determining score values 124 based on error data 118, score data 126, and other score values 124. As described with regard to FIG. 1, video data 104, and in some cases sensor data 105, representing performance of one or more movements by a user 102 may be acquired using a camera or other sensors 103 associated with a user device 106. In some implementations, the user 102 may perform a selected set of movements, such as five movements. In some cases, the user 102 may perform multiple repetitions of each selected movement, such as from three to five repetitions of each movement. Pose data 114 may be generated based on the video data 104 and sensor data 105, the pose data 114 representing the position(s) of the body of the user 102 during performance of the movement(s). Portions of the pose data 114 that are associated with particular movements or individual repetitions of a movement may be determined based on segmentation data. Error data 118 indicative of one or more errors or an absence of errors associated with particular movements or repetitions of a movement may be determined based on correspondence between the determined pose data 114 and movement data 120. The movement data 120 may associate point data 204 representative of positions of users 102 with corresponding error data 118, which may represent sets of errors and in some cases an indication of severity of one or more of the errors.

As shown in FIG. 3, in some implementations, error data 118 may associate an error identifier 302 indicative of particular errors with a corresponding severity level 304 indicative of a severity associated with the particular errors. For example, based on correspondence between pose data 114 indicative of performance of a set of five movements by the user 102, and movement data 120 that associates point data 204 representative of poses with error data 118, error data 118 that represents a particular set of errors corresponding to performance of the movements by the user 102 may be determined. Continuing the example, after performance of a set of five movements, the error data 118 may indicate the occurrence or absence, and in some cases an indication of severity, for a set of twenty errors. Each movement may correspond to one or multiple possible errors, and in some cases, multiple movements may correspond to the same error, while other errors may be associated with only one of the movements. For example, an error associated with a position of a knee of the user 102 may be able to be determined when a particular movement involving a squatting motion is performed, but unable to be determined when other movements are performed. As another example, an error associated with a position of the hips of the user 102 may be able to be determined when a squatting movement, a toe-touching movement, or a jumping movement are performed.

Specifically, FIG. 3 depicts the error data 118 associating a first error identifier 302(1) with a first severity level 304(1), a second error identifier 302(2) with a second severity level 304(2), and any number of additional error identifiers 302(N) with corresponding severity levels 304(N). A severity level 304 may include any type of qualitative or quantitative indication of a severity of an error. For example, the severity level 304 may include an indication of "present" or "absent" with regard to a corresponding error identifier 302. As another example, the severity level 304 may include a qualitative indication, such as "absent", "minor severity", "medium severity", or "high severity" for a corresponding error identifier 302. As yet another example, the severity level 304 may include a quantitative value, such as an integer or non-integer ranging from zero to three, with a greater number indicating a greater severity associated with the error identifier 302.

As described with regard to FIGS. 1 and 2, a scoring module 122 may determine score values 124 associated with performance of the movements by the user 102 based on correspondence between the determined error data 118 and score data 126, which may associate error data 118 with score values 124. In some implementations, the scoring module 122 may determine one or more sets of intermediate values 303, each set of intermediate values 303 corresponding to a particular time or a particular frame of video data 104 associated with the movement of the user 102. For example, the intermediate values 303 may include a first set of values 305(1) associated with first time data 307(1). The first time data 307(1) may indicate a particular time, such as a timestamp associated with a frame of video data 104, an identifier associated with a frame of video data 104 or a portion of determined pose data 114, and so forth. The set of values 305(1) may include scores determined based on a pose associated with a time that corresponds to the time data 307(1). FIG. 3 also depicts the intermediate values 303 including a second set of values 305(2) associated with second time data 307(2), and any number of additional sets of values 305(N) associated with addition time data 307(N).

The intermediate values 303 may be used to determine score values 124 associated with characteristics of movement of the user 102 over a period of time, such as during performance of one or more movements represented by the video data 104. For example, a particular error, and in some cases a severity level 304 associated with the error, may cause a particular value or set of values 305 to be determined, and a particular score value 124 to be determined based on the set of values 305. In other cases, a particular error may cause a particular modification to be applied to a score value 124. Different errors may cause different score values 124 or modifications to score values 124. For example, different score values 124 may be determined for different regions of the body of the user 124, such as the shoulder, core, hip, or lower body, and different score values 124 may be determined for different characteristics of movement, such as posture, stability, and mobility. Additionally, in some cases, one or more score values 124 may be determined based in part on other score values 124, such as a score value 124 indicative of overall stability of a user 102 during performance of the movements based on individual score values 124 indicative of the stability of each region of the body of the user 102. The score data 126 may include one or more rules, algorithms, weight values, and so forth that may determine the manner in which particular score values 124 are determined based on error identifiers 302, severity levels 304, and other score values 124.

For example, FIG. 3 depicts a set of score values 124 that includes a first region identifier 306(1) associated with a first characteristic identifier 308(1) and a first quantitative identifier 310(1). The first region identifier 306(1) may include an indication of a body part of the user 102, such as the shoulder. The first characteristic identifier 308(1) may include an indication of a characteristic of movement, such as stability. The first quantitative identifier 310(1) may include a numerical value that represents a quality of the characteristic of movement indicated by the characteristic identifier 308(1) for the region of the body indicated by the region identifier 306(1). For example, a score of 72% may be indicated for stability of a shoulder of the user 102. In other implementations, the quantitative identifier 310(1) may include a qualitative indicator, such as "poor", "average", or "superior".

The first region identifier 306(1) is also shown associated with a second characteristic identifier 308(2), such as an indication of posture or mobility. The second characteristic identifier 308(2) is associated with a second quantitative identifier 310(2). For example, in addition to the score of 72% for stability of the shoulder of the user 102, a score of 89% for mobility of the shoulder of the user 102 may be determined. While FIG. 3 depicts a single quantitative identifier 310 associated with each characteristic identifier 308, in other implementations, a characteristic identifier 308 may be associated with multiple quantitative identifiers 310, such as multiple scores for stability of a body part of the user 102. Additionally, while FIG. 3 depicts two characteristic identifiers 308 associated with the first region identifier 306(1), any number of characteristic identifiers 308 may be associated with a region identifier 306. Furthermore, in some implementations, one or more of the region identifier 306 or the characteristic identifier 308 may be omitted. For example, a score for the characteristic identifier 308 of "posture" may be presented without indicating a region identifier 306 for a corresponding body part. As another example, a score associated with the "core" region of a user 102 may be presented without indicating a characteristic identifier 308.

FIG. 3 also depicts a second region identifier 306(2) associated with the first characteristic identifier 308(1). For example, the second region identifier 306(2) may indicate a different body part of the user 102 than the first region identifier 306(1), such as the hips of the user 102. The second region identifier 306(2) is shown associated with the first characteristic identifier 308(1), which is in turn associated with a third quantitative identifier 310(3). The second region identifier 306(2) is additionally shown associated with the second characteristic identifier 308(2), which is associated with a fourth quantitative identifier 310(4). For example, in addition to the scores of 72% and 89% for the stability and mobility of the shoulder of the user 102 described above, the score values 124 may also include a score of 92% for stability of the hips of the user 102, and a score of 81% for mobility of the hips of the user 102.

In some implementations, one or more score values 124 may be determined based on one or more other score values 124. For example, FIG. 3 depicts the score values 124 including a fifth quantitative identifier 310(5) associated with the first characteristic identifier 308(1), independent of a region identifier 306. Continuing the example, the fifth quantitative identifier 310(5) may be determined based in part on the first quantitative identifier 310(1) and the third quantitative identifier 310(3), which are also associated with the first characteristic identifier 308(1). As such, the fifth quantitative identifier 310(5) may represent an overall score of 82% for the stability of the user 102, based on the individual quantitative identifiers 310 associated with stability of particular body parts of the user 102. Similarly, FIG. 3 depicts a sixth quantitative identifier 310(6) associated with the second characteristic identifier 308(2), which may be determined based in part on the second quantitative identifier 310(2) and the fourth quantitative identifier 310(4) that are associated with the second characteristic identifier 308(2). For example, the sixth quantitative identifier 310(6) may represent an overall score of 85% for mobility of the user 102, based on the individual quantitative identifiers 310 associated with mobility of particular body parts of the user 102.

Figure 4:
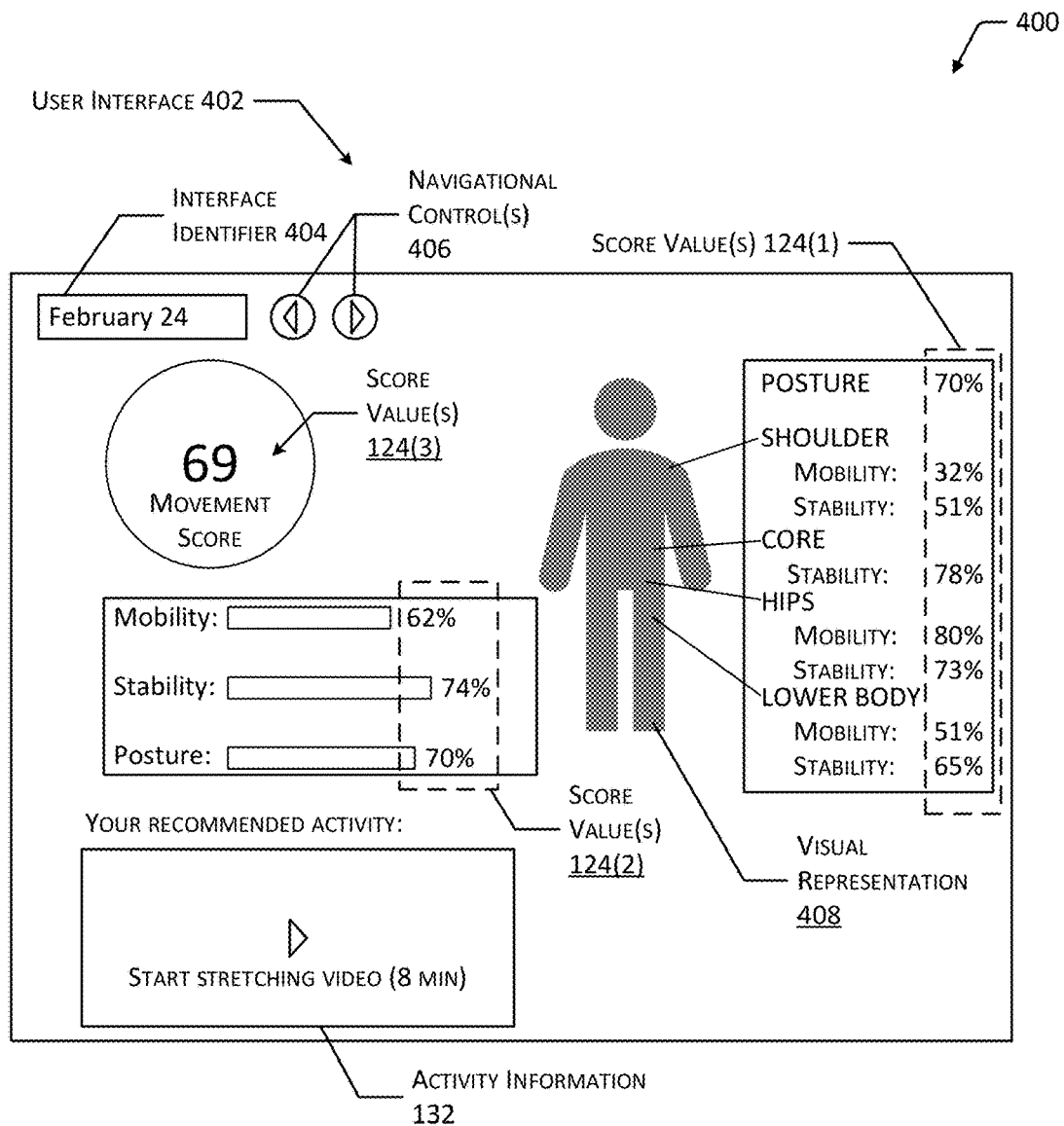
FIG. 4 is a block diagram illustrating an example implementation of a user interface for presenting score values indicative of characteristics of movement of a user.

FIG. 4 is a block diagram 400 illustrating an example implementation of a user interface 402 for presenting score values 124 indicative of characteristics of movement of a user 102. As described with regard to FIG. 1, after a user 102 performs one or more movements, an output 108 that includes information regarding characteristics of the movement(s), such as a user interface 402, may be presented. In some implementations, the user interface 402 may include an interface identifier 404, which may be used to differentiate the user interface 402 from other interfaces. For example, the interface identifier 404 may include an indication of a date or time at which the user 102 performed the movement(s), an identification of one or more of the movements, an identification of the user 102, and so forth. In some cases, the use interface 402 may also include one or more navigational controls 406, such as for navigating to other interfaces. For example, FIG. 4 depicts the navigational controls 406 including directional buttons that may be used to navigate to user interfaces 402 associated with other dates. Continuing the example, through use of navigational controls 406, a user 102 may access user interfaces 402 that indicate characteristics of the movement(s) performed by the user 102 at different times.

As described with regard to FIGS. 1-3, one or more score values 124 that are indicative of characteristics of movement(s) performed by the user 102 may be determined based in part on correspondence between pose data 114 representing the movement(s) of the user 102 and movement data 120 that associates positions of users 102 with error data 118. The score values 124 representing characteristics of the movement(s) of the user 102 may in turn be determined based in part on correspondence between the error data 118 and score data 126, which may indicate the manner in which particular errors, severity levels 304 of the errors, and the absence of errors may affect the score values 124 that may be presented in a user interface 402. For example, FIG. 4 depicts a first set of score values 124(1) indicative of characteristics of movement of the user 102 that are associated with one or more body parts of the user 102, one or more particular movement characteristics, or both a body part and a movement characteristic. Continuing the example, the first set of score values 124(1) are shown including a score value 124(1) indicative of an overall posture of the user 102 when performing the movement(s), two score values 124(1) indicative of the mobility and stability of the shoulder of the user 102, one score value 124(1) indicative of the stability of the core of the user 102, two score values 124(1) indicative of the mobility and stability of the hips of the user 124, and two score values 124(1) indicative of the mobility and stability of the lower body of the user 102. In the user interface 402, score values 124(1) associated with a particular body part of the user 102 are shown adjacent to and indicating a corresponding body part in a visual representation 408 of a body. In some implementations, the visual representation 408 may include an image of the user 102. In other implementations, the visual representation 408 may include an image of a different individual, such as a paid model, actor, or other individual. In still other implementations, the visual representation 408 may include a diagram of a body, or an artificially-generated or computer-generated image of a human.

As described with regard to FIG. 3, while some score values 124 may be determined based on error data 118 and score data 126, in some implementations, score values 124 may also be determined based in part on other score values 124. Additionally, in some implementations, a score value 124 may be determined based on a combination of other score values 124, error data 118, and score data 126. For example, FIG. 4 depicts a second set of score values 124(2) that represent characteristics of movement of the user 102 independent of one or more regions of the body of the user 102. Continuing the example, the second set of score values 124(2) is shown including a score value 124(2) indicative of posture of the user 102, a score value 124(2) indicative of stability of the user 102, and a score value 124(2) indicative of mobility of the user. As described with regard to FIG. 3, in some implementations, a score value 124(2) indicative of a particular characteristic of movement may be determined based in part on score values 124(1) indicative of the same characteristic of movement for individual body parts of the user 102, such as by determining a weighted average or other mathematical function of the individual score values 124(1). FIG. 4 also depicts a score value 124(3) indicative of an overall quality of movement of the user 102. For example, the score value 124(3) may be determined based in part on a mathematical function of the first set of score values 124(1), the second set of score values 124(2), or both the first set of score values 124(1) and the second set of score values 124(2).

As described with regard to FIG. 1, activity information 132 indicative of one or more activities that may be performed to reduce the occurrence or severity of one or more errors, improve one or more characteristics of movement, or improve one or more score values 124 may be presented in an output 108. Activity information 132 may be determined based in part on correspondence between error data 118 associated with the movement(s) of the user 102 and activity data 130 that associates activity information 132 with error data 118. In some implementations, activity information 132 may be determined based in part on the score values 124, the pose data 114 associated with movement of the user 102, or other data, such as data regarding previous activities of the user 102 or previous output 108 presented to the user 102. For example, if a user 102 has recently been provided with a recommendation for a particular activity within a threshold length of time, activity information 132 associated with a different activity may be presented. In some implementations, the activity information 132 may include content presented in the user interface 402, such as instructions for performance of an activity. For example, FIG. 4 depicts a window within the user interface 402 that may be actuated to begin presentation of a video. In other implementations, the activity information 132 may include navigational links to information regarding performance of the activity, or information regarding the manner in which instructions for performing the activity may be accessed. In some implementations, the activity information 132 may include an indication of multiple activities, such as a plan of action that may be performed over a period of time to improve characteristics of the movement of a user 102.

Figure 5:
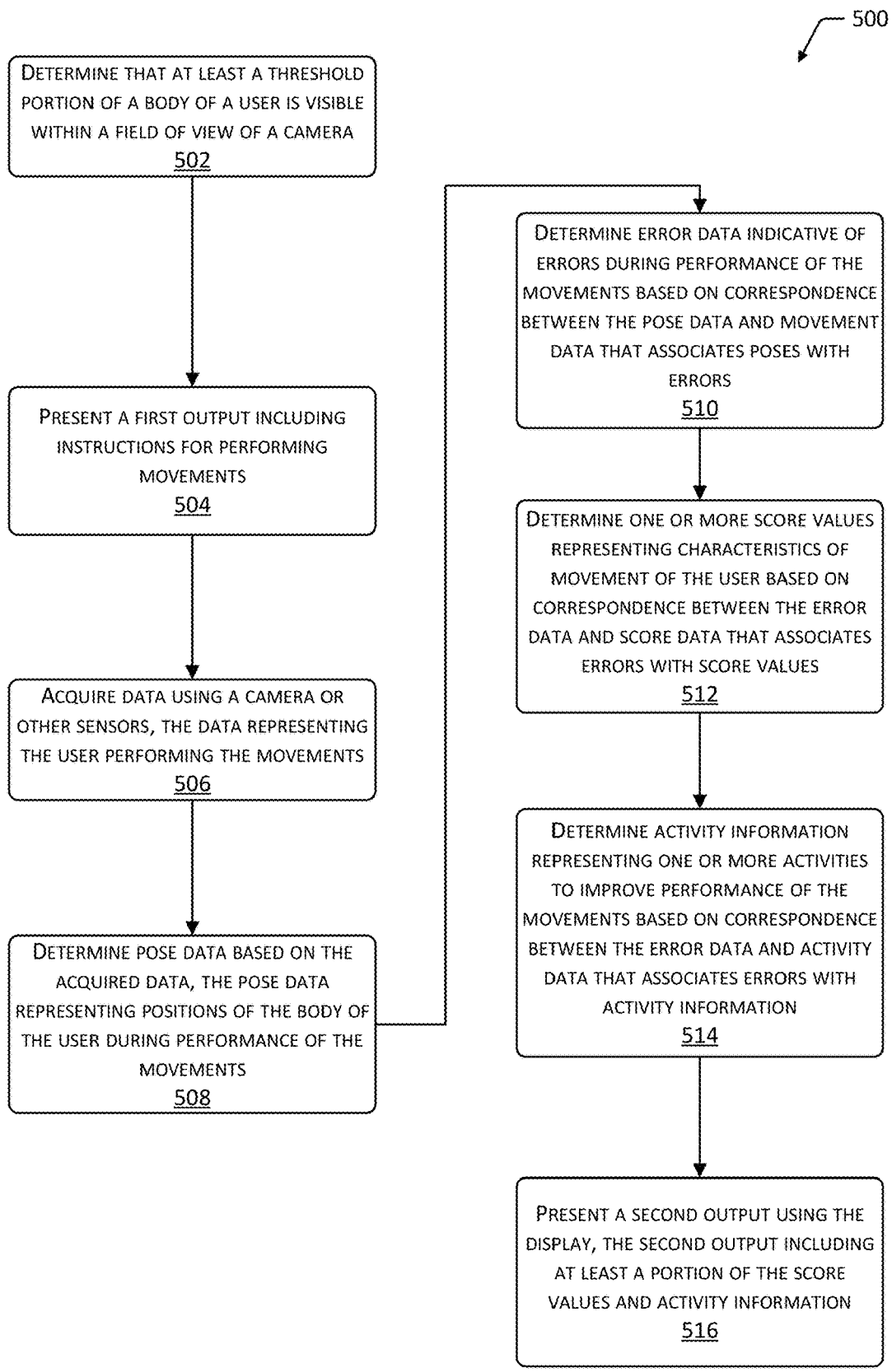
FIG. 5 is a flow diagram illustrating an implementation of a method for determining characteristics of movement of a user based on acquired video data representing the user performing one or more movements.

FIG. 5 is a flow diagram 500 illustrating an implementation of a method for determining characteristics of movement of a user 102 based on acquired video data 104 representing the user 102 performing one or more movements.

At 502, a determination may be made that at least a threshold portion of a body of a user 102 is visible within a field of view of a camera. For example, a user device 106 associated with a camera may determine whether the user 102 is positioned relative to the camera in a manner that would enable evaluation of the movements of the user 102 based on acquired video data 104. In some implementations, such a determination may include determining a distance of the user 102 relative to the camera to be less than a threshold maximum distance and greater than a threshold minimum distance. In other implementations, such a determination may include determining that selected parts of the body of the user 102 are able to be identified using object recognition, pose extraction, or other types of algorithms. For example, a determination may be made that at least a threshold number of body parts of the user 102 that correspond to points included within a determined pose are able to be identified. In some implementations, a position of a user 102 may be determined using a depth sensor, time-of-flight sensor, or other types of sensors 103 in addition to or in place of a camera. For example, a sensor 103 may generate point cloud data, which may be processed to determine locations of one or more parts of the body of the user 102.

At 504, a first output 108 may be presented. The first output 108 may include instructions for performing movements. For example, the first output 108 may include a video, text instructions, audio instructions, one or more images, or another type of data that may instruct a user 102 regarding performance of one or more movements. The user 102 may attempt to perform the movements within a field of view of a camera during or after viewing the first output 108.

At 506, data representing the user 102 performing the movements may be acquired using a camera or other sensors 103. For example, the user device 106 presenting the first output 108 may also include a camera, or a separate camera associated with the user device 106 or with a different computing device may be in an environment with the user 102, and the user 102 may perform the movements within the field of view of the camera. Video data 104 acquired using the camera may be processed and analyzed by the user device 106 or transmitted to another device, such as one or more servers 110. In other implementations, a combination of the user device 106 and one or more other computing devices may process and analyze the video data 104. Sensor data 105, such as data from one or more accelerometers indicating movement of the user 102, data from position sensors, location sensors, or touch sensors indicating a position of one or more body parts of the user 102, and so forth may also be analyzed by the user device 106 or transmitted to another device. In some implementations, a depth sensor, time-of-flight sensor, or other types of sensors 103 may be used to determine a position of one or more body parts of the user 102, such as by outputting point cloud data, which may be processed to determine pose data 114.

At 508, pose data 114 may be determined based on the acquired data. The pose data 114 may represent positions of the body of the user 102 during performance of the movements. For example, one or more object recognition algorithms, shape recognition algorithms, segmentation algorithms, and so forth may identify portions of frames of video data 104 in which the user 102 is visible, and portions of frames of video data 104 that correspond to particular body parts of the user 102. Body parts of the user 102 may be represented as points within a pose. The locations and orientations of one or more points may be constrained by the location of one or more other points based on a set of rules. In some implementations, data regarding a point may also indicate movement of the point, a confidence value associated with the location of the point, and so forth. In some implementations, the pose data 114 may also include segmentation information, shape information, information regarding a three-dimensional position of an individual or other object, and so forth. For each set of points, the pose data 114 may also include time data or frame data, such as a frame identifier 202 indicative of a frame or time associated with one or more poses represented by the pose data 114. For example, the pose data 114 may associate a first frame identifier 202 or first time data with a first set of points, a second frame identifier 202 or second time data with a second set of points, and so forth. In some implementations, the pose data 114 may be analyzed or processed based on segmentation data. For example, segmentation data may include data indicative of poses or other types of data representing particular movements or repetitions of movements. Based on the segmentation data, a portion of the pose data 114 that corresponds to a particular movement or a particular repetition of a movement may be determined. In some implementations, based on the segmentation data, one or more portions of the pose data 114 that do not correspond to any of the movements may be determined and disregarded from analysis, such as to conserve computational resources, reduce data transmission, and so forth.

At 510, error data 118 indicative of errors during performance of the moments may be determined based on correspondence between the pose data 114 and movement data 120. The movement data 120 may associate poses with errors, severity levels of errors, or the absence of errors. For example, movement data 120 may include one or more videos, pose data 114, sets of points representing poses, or other types of inputs provided by content curators or other types of expert or non-expert users. In other cases, movement data 120 may include videos, pose data 114, or sets of points determined from the user 102 or other users 102 performing the movements. The movement data 120 may associate point data 204 indicative of a set of points representing a position of a user 102 with corresponding error data 118 indicative of one or more errors associated with the position, a severity level 304 associated with the error(s), or the absence of errors. In some implementations, the error data 118 associated with performance of the movements by the user 102 may be determined using a machine learning system to classify the pose data 114 of the user 102 using the movement data 120.

At 512, one or more score values 124 representing characteristics of movement of the user 102 may be determined based on correspondence between the error data 118 and score data 126. The score data 126 may associate the error data 118 with score values 124. For example, as described with regard to FIGS. 1-4, score data 126 may associate particular sets of errors, severity levels 304 of errors, or the absence of errors, with corresponding score values 124, with modifications to score values 124, and so forth. The score data 126 may also include weight values, rules, algorithms, and so forth that indicate the effect of particular errors and severity levels 304 on particular score values 124. As described with regard to FIGS. 3 and 4, in some cases, one or more score values 124 may be determined based in part on other score values 124. For example, particular score values 124 may be indicative of a particular characteristic of movement associated with a particular body part of the user 102, while other score values 124 may be indicative of an overall characteristic of movement, or with an overall quality of movement representative of multiple characteristics.

At 514, activity information 132 representing one or more activities to improve performance of the movements may be determined. The activity information 132 may be determined based on correspondence between the error data 118 and activity data 130 that associates error data 118 with activity information 132. For example, performance of a particular activity may possibly reduce occurrence or severity of one or more particular errors, improve one or more characteristics of movement, improve one or more score values 124, and so forth. In some implementations, one or more errors may be associated with a priority level. In such a case, activity information 132 associated with an error having a higher priority may be presented in place of or prior to activity information 132 associated with an error having a lower priority. Additionally, in some implementations, when particular activity information 132 that has been previously presented to a user 102 within a threshold length of time, other activity information 132 may be presented in place of or prior to the particular activity information 132. In some implementations, activity information 132 may include multiple activities that may be performed over a period of time to improve one or more characteristics of the movement of a user 102.

At 516, a second output 108 may be presented using the display, the second output 108 including at least a portion of the determined score values 124 and activity information 132. In some implementations, the second output 108 may include a user interface 402, as described with regard to FIG. 4. For example, a user interface 402 may include navigational links to obtain information about activities or scores, to access user interfaces 402 associated with different time periods, and so forth. The user interface 402 may also include instructions or other activity information 132, such as text, controls to initiate presentation of audio or video instructions, and so forth. The user interface 402 may include visual representations 408 or other visual indicia that may facilitate understanding of score values 124, types of movement, and regions of the body to which the score values 124 are applicable.

Figure 6:
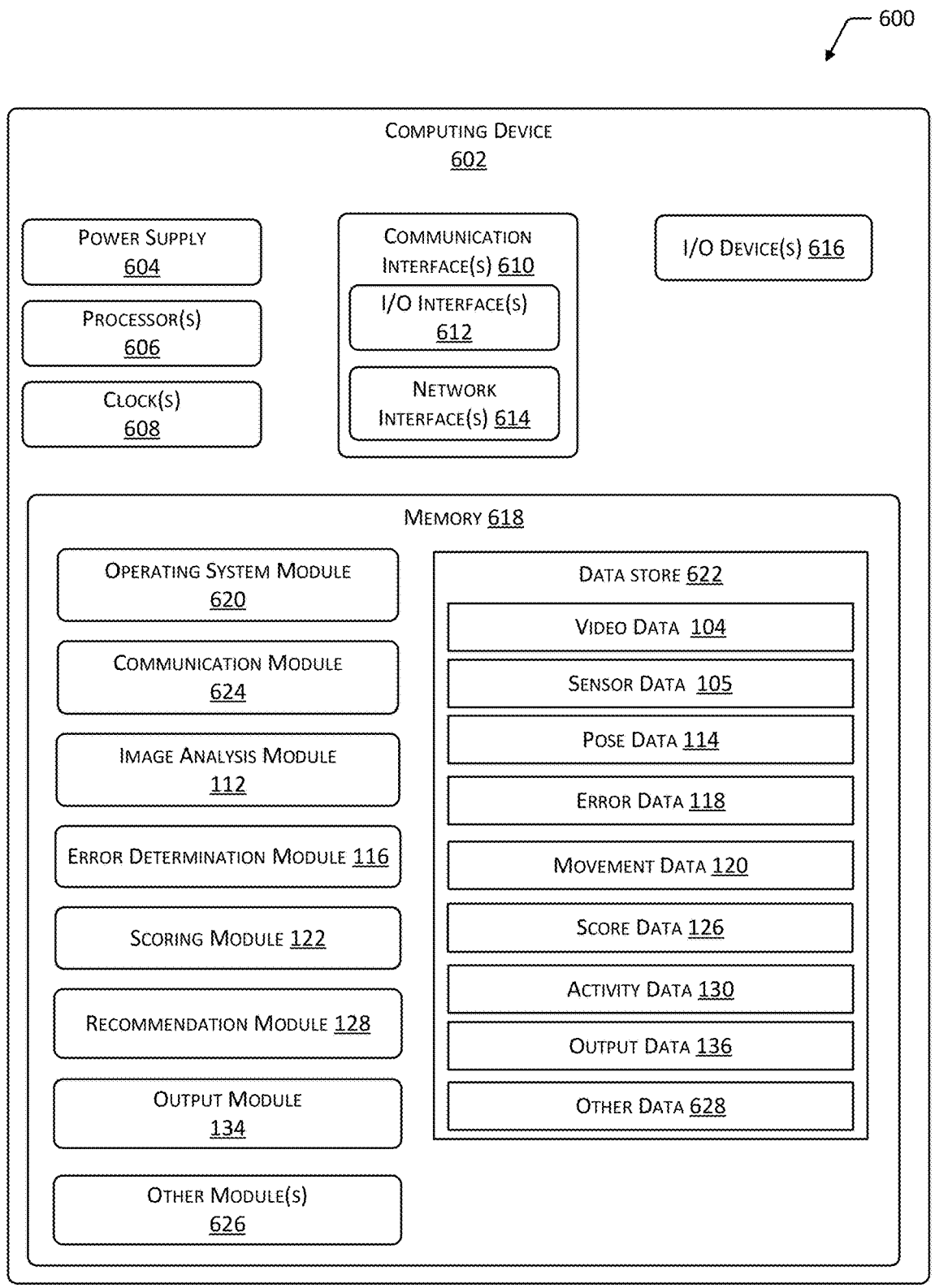
FIG. 6 is a block diagram illustrating an implementation of a computing device within the present disclosure.

FIG. 6 is a block diagram 600 illustrating an implementation of a computing device 602 within the present disclosure. The computing device 602 may include one or more server(s) 110, as described with regard to FIG. 1. In other implementations, the computing device 602 may include one or more user devices 106 or other devices in an environment with a user device 106 or remote from the user device 106, such as in communication with the user device 106 via one or more networks. Additionally, while FIG. 6 depicts a single block diagram 600 of a computing device 602, any number and any type of computing devices 602 may be used to perform the functions described herein.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clock(s) 608 may provide information indicative of date, time, ticks, and so forth. For example, the processor(s) 606 may use data from the clock 608 to generate a timestamp, trigger a preprogrammed action, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input devices or output devices associated with the computing device 602. For example, I/O devices 616 may include touch sensors, displays, touch sensors integrated with displays (e.g., touchscreen displays), keyboards, mouse devices, microphones, image sensors, cameras, depth sensors, time-of-flight detection systems such as lidar, scanners, speakers or other types of audio output devices, haptic devices, printers, and so forth. In some implementations, the I/O devices 616 may be physically incorporated with the computing device 602. In other implementations, I/O devices 616 may be externally placed. I/O devices 616 may also include sensors 103 for determining the location, orientation, or movement of one or more body parts of a user 102, such as accelerometers, position sensors, depth sensors, time-of-flight sensors, and so forth.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, 5G, LTE, and so forth.

The computing device 602 may include one or more buses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store the image analysis module 112. The image analysis module 112 may determine pose data 114 based on stored or acquired video data 104, and in some implementations, sensor data 105 acquired using one or more sensors 103. In some implementations, the image analysis module 112 may include one or more object recognition or segmentation algorithms that may identify portions of frames of video data 104 in which a user 102 is visible. In some implementations, the image analysis module 112 may use one or more object recognition algorithms, or other techniques, to determine portions of frames of video data 104 that correspond to particular body parts of a user 102. Pose data 114 may represent the determined positions of parts of a body as a set of points. The locations and orientations of one or more points may be constrained by the location of one or more other points based on a set of rules. In some implementations, each point of a pose may associate an identifier of the point with a particular location or orientation of the point. In some implementations, data regarding a point may also indicate movement of the point, a confidence value associated with the location of the point, and so forth. In some implementations, the pose data 114 may also include segmentation information, shape information, information regarding a three-dimensional position of an individual or other object, and so forth. The pose data 114 may also include data indicative of a frame of video data 104 or a time associated with one or more poses represented by the pose data 114. While the image analysis module 112 is described with regard to analysis of video data 104 received from a user 102, in some implementations, the image analysis module 112 may also be used to generate movement data 120. For example, video data 104 representing performance of movements by trainers, experts, non-experts, content curators, and so forth may be analyzed to determine pose data 114 that may be used to classify subsequent video data 104 received from users 102.

The memory 618 may additionally store the error determination module 116. The error determination module 116 may determine error data 118 based on correspondence between the pose data 114 and movement data 120. The movement data 120 associates pose data 114 determined from one or more videos, the pose data 114, or sets of points representing positions with corresponding error data 118. The error data 118 may indicate particular errors, severity levels associated with one or more errors, or an absence of errors. The poses indicated in the movement data 120 may be annotated, such as through expert review or an automated system, to indicate error data 118 represented by particular poses. In some implementations, the error determination module 116 may include a neural network or other type of machine learning system, which may classify pose data 114 received from a user 102 performing a set of movements, or another source, based on the movement data 120. For example, if a portion of the pose data 114 associated with a particular movement corresponds to a portion of the movement data 120 associated with the particular movement within a threshold level of confidence, this may indicate that the errors, severity levels 304 of the errors, or absence of errors associated with the corresponding portion of the movement data 120 may also have occurred during performance of the movement by the user 102.

The memory 618 may also store the scoring module 122. The scoring module 122 may determine one or more score values 124 associated with movement of a user 102 based on correspondence between error data 118 associated with the user 102 and score data 126. The score data 126 may associate particular errors, severity levels, or absence of errors with corresponding score values 124. In some implementations, the scoring module 122 may determine multiple score values 124 indicative of characteristics of the movement(s) of the user 102. For example, determined score values 124 may include individual score values 124 associated with particular regions of the body of the user 102 and particular characteristics of movement. In some implementations, score value(s) 124 may include one or more average or aggregate values determined from one or more other score values 124. For example, one or more determined score values 124 may include an overall indication of a mobility of the user 102, an overall indication of a stability of the user 102, an overall indication of a posture of the user 102, an overall indication of quality of movement of the user 102, and so forth. In some cases, one or more individual score values 124 may be weighted differently when determining one or more aggregate or average score values 124. The score data 126 may include rules, weights, algorithms, and so forth that indicate the effect of a particular error, and in some cases an indication of a severity of the error, when determining particular score values 124.

The memory 618 may store the recommendation module 128. The recommendation module 128 may determine activity information 132 that corresponds to error data 118 associated with a user 102. For example, the recommendation module 128 may determine correspondence between the error data 118 and activity data 130 that associates errors, severity levels 304 of errors, or the absence of one or more errors with corresponding activities to determine activity information 132 indicative of one or more activities that correspond to the movement(s) of the user 102. Performance of the corresponding activities may be used to reduce occurrence or severity of errors, improve characteristics of movement, improve score values 124, and so forth.

The memory 618 may also store the output module 134. The output module 134 may determine output data 136 based on the determined score values 124 and activity information 132. In some implementations, the output module 134 may also access one or more rules, algorithms, templates, formats, and so forth that may be used to control the format, layout, style, or other characteristics of a user interface 402 or other type of output 108 that is presented. As one example, the output 108 may include a user interface 402, that presents score values 124 in association with indications of regions of the body of the user 102 and movement characteristics, other score values 124 determined based in part on the individual score values 124, and links to access or controls to initiate playback of activity information 132.

Other modules 626 may also be present in the memory 618. For example, other modules 626 may include permission or authorization modules to enable a user 102 to provide authorization to acquire video data 104 of the user 102. For users 102 that do not opt-in or otherwise authorize acquisition of video data 104 that depicts the user 102, generation, transmission, or use of such video data 104 may be prevented. Other modules 626 may also include encryption modules to encrypt and decrypt communications between computing devices 602, authentication modules to authenticate communications sent or received by computing devices 602, a permission module to assign, determine, and manage user permissions to access or modify data associated with computing devices 620, user interface modules to generate interfaces for receiving input from users 102, such as selection of video data 104 for presentation, and so forth. Other modules 626 may also include modules for acquiring data using sensors 103. For example, in addition to acquiring data indicative of a position of a user 102 using one or more cameras, in some implementations, sensors 103 may be worn, held, or positioned in an environment with a user 102. The sensors 103 may generate sensor data 105 indicative of a location of the sensor 103 or of a body part of the user 102 that is associated with the sensor 103, which may be used in addition to data acquired using a camera.

Other data 628 within the data store(s) 622 may include configurations, settings, preferences, and default values associated with computing devices 602. Other data 628 may also include encryption keys and schema, access credentials, and so forth. Other data 628 may additionally include formats, layouts, or templates for presentation of user interfaces 402 or other types of output. Other data 628 may include threshold data, such as threshold confidence values for determining errors based on pose data 114 from a user 102.

In different implementations, different computing devices 602 may have different capabilities or capacities. For example, servers 110 may have greater processing capabilities or data storage capacity than user devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations.

Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
cause a user device to present instructions to perform a plurality of movements;
acquire, using a camera of the user device, video data that represents a user within a field of view of the camera performing the plurality of movements;
determine pose data based on the video data, wherein the pose data is indicative of one or more positions of the user during performance of the plurality of movements;
determine correspondence between the pose data and movement data, wherein the movement data associates poses of users with errors in movement of the users;
determine, based on the correspondence between the pose data and the movement data, one or more errors associated with the pose data;
determine correspondence between the one or more errors and score data, wherein the score data associates errors with score values;
determine, based on the correspondence between the one or more errors and the score data, one or more score values associated with the pose data;
determine, based on the one or more score values, at least one score indicative of a characteristic of movement of the user;
determine correspondence between the one or more errors and activity data, wherein the activity data associates errors with activities to improve movements;
determine, based on the correspondence between the one or more errors and the activity data, at least one activity to improve the characteristic of movement of the user; and
cause the user device to present an output indicative of the at least one score and the at least one activity.

2. The system of claim 1, further comprising computer-executable instructions to:
determine correspondence between the pose data and segmentation data indicative of at least a first movement and a second movement of the plurality of movements; and
determine, based on the correspondence between the pose data and the segmentation data: a first portion of the pose data associated with the first movement by the user and a second portion of the pose data associated with the second movement by the user;
wherein at least a subset of the one or more errors is associated with the first movement.

3. The system of claim 1, wherein the movement data includes one or more of a plurality of video data or a plurality of pose data, and the computer-executable instructions to determine the correspondence between the pose data and the movement data include computer-executable instructions to:
use a machine learning system to classify the pose data using the one or more of the plurality of video data or the plurality of pose data, wherein the one or more errors are determined based on errors associated with at least a subset of the one or more of the plurality of video data or the plurality of pose data.

4. A method comprising:
determining movement data that associates each position of a plurality of positions with a respective corresponding error data;
determining first video data that represents a user performing one or more movements;
determining pose data based on the first video data, wherein the pose data is indicative of one or more positions of the user;
determining a first position of the one or more positions based on the pose data;
determining a first error associated with the first position of the user based on correspondence between the first position and a second position indicated in the movement data, wherein the movement data associates the second position with the first error;
determining a first score value based on the first error; and
determining a first output indicative of the first score value.

5. The method of claim 4, further comprising:
determining correspondence between activity data and one or more of the first position or the first error, wherein the activity data associates the one or more of the first position or the first error with at least one activity; and
determining a second output indicative of the at least one activity.

6. The method of claim 4, further comprising:
determining a second error based on correspondence between the pose data and the movement data, wherein the first error is associated with a first portion of a body of the user and the second error is associated with a second portion of the body of the user;
determining a second score value based on the second error; and
including, in the first output, an indication of the first score value in association with an indication of the first portion of the body and an indication of the second score value in association with an indication of the second portion of the body.

7. The method of claim 4, further comprising:
determining a second error based on correspondence between the pose data and the movement data;
determining a second score value based on the second error;
determining a first weight value associated with the first score value and a second weight value associated with the second score value;
determining a third score value based on the first weight value, the first score value, the second weight value, and the second score value; and
including the third score value in the first output.

8. The method of claim 4, wherein the first score value is associated with a first characteristic of movement of the user, the method further comprising:
determining a second score value based on the first error, wherein the second score value is associated with a second characteristic of the movement of the user; and
including an indication of the second score value in the first output.

9. The method of claim 4, further comprising:
determining, based on correspondence between the pose data and movement data, a first severity level associated with the first error, wherein the first severity level is associated with the first score value and a second severity level for the first error is associated with a second score value.

10. The method of claim 4, further comprising:
determining a second error based on correspondence between the pose data and the movement data;
determining, based on the movement data, a first priority value associated with the first error and a second priority value associated with the second error;
determining that the first priority value indicates a greater priority than the second priority value;
based on the first priority value indicating the greater priority than the second priority value, determining correspondence between the first error and activity data, wherein the activity data associates the first error with at least one activity; and
including an indication of the at least one activity in the first output.

11. The method of claim 4, wherein the first score value is associated with the user performing the one or more movements at a first time, the method further comprising:
determining a second score value associated with the user performing the one or more movements at a second time; and
including, in the first output, an indication of the first score value in association with the first time and an indication of the second score value in association with the second time.

12. The method of claim 4, further comprising:
before determining the pose data, determining, based on one or more of the first video data or second video data, that at least a threshold portion of a body of the user is within a field of view of a camera.

13. A system comprising:
one or more memories storing computer-executable instructions; and
one or more hardware processors to execute the computer-executable instructions to:
determine movement data that associates each position of a plurality of positions with a respective corresponding error data;
determine first video data that represents a user performing one or more movements;
determine first pose data based on the first video data, wherein the first pose data is indicative of one or more positions of the user;
determine a first position of the user based on the pose data;
determine a first error associated with the first position of the user based on correspondence between the first position and a second position indicated in the movement data, wherein the movement data associates the second position with the first error, and wherein the first error is associated with a characteristic of the one or more movements;
determine at least one first activity associated with the characteristic based on correspondence between one or more of the first position or the first error and activity data that associates the one or more of the first position or the first error with the at least one first activity; and
determine a first output indicative of the at least one first activity.

14. The system of claim 13, further comprising computer-executable instructions to:
determine correspondence between the first error and score data, wherein the score data associates the first error with a first score value; and
determine a second output indicative of the first score value.

15. The system of claim 13, further comprising computer-executable instructions to:
determine, based on correspondence between the first pose data and the movement data, one or more positions that are constrained from performance by the user;
determine, based on the activity data, a portion of the at least one first activity associated with the one or more positions; and
include, in the first output, an indication of one or more modifications to the at least one first activity based on the one or more positions.

16. The system of claim 13, further comprising computer-executable instructions to:
at a first time, determine correspondence between the first error and score data, wherein the score data associates the first error with a first score value;
determine an indication of performance of the at least one first activity by the user;
at a second time after the first time, determine second video data that represents the user performing the one or more movements;
determine second pose data based on the second video data;
determine a second error based on correspondence between the second pose data and the movement data;
determine a second score value based on correspondence between the second error and the score data; and
determine at least one second activity based on the activity data and a difference between the second score value and the first score value.

17. The system of claim 13, further comprising computer-executable instructions to:
at a first time, determine an indication of performance of the at least one first activity by the user;
at a second time after the first time, determine second video data that represents the user performing the one or more movements;
determine second pose data based on the second video data;
determine the first error based on correspondence between the second pose data and the movement data;
based on the indication of the performance of the at least one first activity by the user, determine at least one second activity based on correspondence between the first error and the activity data; and
determine a second output indicative of the at least one second activity.

18. The system of claim 13, wherein the movement data includes one or more of second video data or second pose data associated with an indication of the first error, and the computer-executable instructions to determine the first error based on the correspondence between the first position and the second position indicated in the movement data further comprise computer-executable instructions to:
use a machine learning system to classify the first position as corresponding to the second position included in the one or more of the second video data or the second pose data within at least a threshold confidence value.

19. The system of claim 13, further comprising computer-executable instructions to:
  determine correspondence between the first pose data and segmentation data indicative of a first movement of the one or more movements; and
  determine, based on the correspondence between the first pose data and the segmentation data, a first portion of the first pose data associated with the first movement;
  wherein the first error is associated with the first movement.

20. The system of claim 13, further comprising computer-executable instructions to:
  determine, based on one or more of the first video data or second video data, that at least a threshold portion of a body of the user is within a field of view of a camera.

* * * * *